(12) United States Patent
Few

(10) Patent No.: US 6,244,384 B1
(45) Date of Patent: Jun. 12, 2001

(54) TRANSMISSION FLUID EXCHANGER

(75) Inventor: Jeffrey P. Few, Elkhart, IN (US)

(73) Assignee: Flo-Dynamics, Inc. LLC, Compton, CA (US)

(*) Notice: Subject to any disclaimer, the term of this patent is extended or adjusted under 35 U.S.C. 154(b) by 0 days.

(21) Appl. No.: 09/300,534

(22) Filed: Apr. 27, 1999

(51) Int. Cl.[7] .................................... F16C 3/14
(52) U.S. Cl. ......................... 184/1.5; 184/106; 141/98
(58) Field of Search .................. 184/1.5, 106; 141/98; 123/196 R

(56) References Cited

U.S. PATENT DOCUMENTS

| | | |
|---|---|---|
| 1,655,939 | 1/1928 | Copeland . |
| 1,815,221 | 7/1931 | Sweetland . |
| 1,829,173 | 10/1931 | Wertz . |
| 1,884,820 | 10/1932 | Osborne . |
| 1,971,555 | 8/1934 | Fox . |
| 2,320,048 | 5/1943 | Parson . |
| 2,499,705 | 3/1950 | Vokes . |
| 2,499,909 | 3/1950 | Fox . |
| 3,216,527 | 11/1965 | Lewis . |
| 3,447,636 | 6/1969 | Bonfilio . |
| 3,513,941 | 5/1970 | Becnel . |
| 3,692,212 | 9/1972 | Irie et al. . |
| 3,720,287 | 3/1973 | Martel . |
| 3,797,703 | 3/1974 | Yamawaki et al. . |
| 3,867,999 | 2/1975 | Cox . |
| 4,095,672 | 6/1978 | Senese . |
| 4,095,673 | 6/1978 | Takeuchi . |

(List continued on next page.)

FOREIGN PATENT DOCUMENTS

| | | |
|---|---|---|
| 61-79099 | 5/1986 | (JP) . |
| 63-222800 | 3/1990 | (JP) . |
| 116499 | 1/1992 | (JP) . |

OTHER PUBLICATIONS

Document relating to Tatsuno ATF Changer (no date).
Set of instructions purportedly utilized by employees of Grease Monkey of Denver, Colorado (no date).
Brochure from Engine Solution (no date).
Documents relating to Powerclean 2000 (no date).
Promotional literature for Automa Fluid Changer ATF AFC–6000M and a Japan Translation thereof, not dated.
Promotional literature and Chinese translation thereof, Automobile Buying Guide, Dec. 1993 and depicting oil changing equipment.
Promotional literature and Chinese translation thereof, Automobile Buying Guide, Oct. 1990 mentioning ATF oil changing machine.
Taiwan Automobile Repair Industries Association Journal and Chinese translation thereof, 1991, discussing oil changing devices.
Promotional literature for ORBIS ATF QU–46S and Japanese translation thereof, not dated.
Promotional literature for the ATF Circulation/Compression Two Directional Automatic Transmission Changer and Chinese translation thereof, WH–102, WH–202 devices.

(List continued on next page.)

*Primary Examiner*—David Fenstermacher
(74) *Attorney, Agent, or Firm*—Fulwider Patton Lee & Utecht, LLP

(57) ABSTRACT

A hand held transmission fluid exchanger including a housing block having parallel new and used fluid passages therein, such passages being joined by a return passage having a pressure relief valve therein. The method involves connecting such exchanger with a conventional on-demand transmission fluid supply system having a meter therein and holding the dispensing gun open so that flow is controlled by valves incorporated in the exchanger.

28 Claims, 3 Drawing Sheets

U.S. PATENT DOCUMENTS

| | | |
|---|---|---|
| 4,128,140 | 12/1978 | Riches . |
| 4,138,042 | 2/1979 | Okada . |
| 4,595,122 | 6/1986 | Yoshida et al. . |
| 4,674,456 | 6/1987 | Merritt . |
| 4,719,991 | 1/1988 | Diehn et al. . |
| 4,745,989 | 5/1988 | DiMatteo . |
| 4,807,674 | 2/1989 | Sweet . |
| 4,869,346 | 9/1989 | Nelson . |
| 4,938,315 | 7/1990 | Ohta et al. . |
| 4,951,784 | 8/1990 | Bedi . |
| 4,998,437 | 3/1991 | Magoolaghan . |
| 5,056,621 | 10/1991 | Trevino . |
| 5,062,398 | 11/1991 | Bedi et al. . |
| 5,062,500 | 11/1991 | Miller et al. . |
| 5,090,458 | 2/1992 | Creeron . |
| 5,092,429 | 3/1992 | Linares et al. . |
| 5,148,785 | 9/1992 | Sendak . |
| 5,289,837 | 3/1994 | Betancourt . |
| 5,291,968 | 3/1994 | Brown . |
| 5,318,080 | 6/1994 | Viken . |
| 5,337,708 | 8/1994 | Chen . |
| 5,370,160 | 12/1994 | Parker . |
| 5,372,219 | 12/1994 | Peralta . |
| 5,390,762 | 2/1995 | Nelson . |
| 5,415,247 | 5/1995 | Knorr . |
| 5,427,202 | 6/1995 | Behring et al. . |
| 5,429,159 | 7/1995 | Tees et al. . |
| 5,447,184 | 9/1995 | Betancourt . |
| 5,472,064 | 12/1995 | Viken . |
| 5,522,474 | 6/1996 | Burman . |
| 5,535,849 | 7/1996 | Few . |
| 5,626,170 | 5/1997 | Parker . |
| 5,743,357 | 4/1998 | Few . |

OTHER PUBLICATIONS

Advertising from Car Purchasing Month, Jul. 1994, and translation thereof, relating to ATF oil changing.

Advertisement appearing in Dec. 1993 of Car Purchasing Monthly and translation thereof, Good Work and Good Tools.

Advertisement appearing in Jun. 1, 1994 Taiwan Automobile Repair Ind. Assoc. and translation thereof, titled The ATF Circulation/Compression Two Directional Automatic Fluid Changer and depicting alleged oil changing devices.

Advertisement appearing in Oct. 1990 Car Purchasing Month and translation thereof, titled Examples of Rust Protection and Bardahl AT advertisements.

Promotional Literature titled Automa Fluid Changer AFC–6000 by Yamada Corporation, not dated.

Promotional literature and purported translation thereof relating to Automa Fluid Changer AFC Series, AFC–6000, AFC–1500, AFC–9800fa from Yamada Corporation, not dated.

Picture, labels and translations thereof of WH–303 device, purportedly an oil changing device, not dated.

Yamada AFC–6000 Automatic Fluid Changer Manual and translation thereof, allegedly printed in Nov., 1991.

TRANSMISSION FLUID EXCHANGER

BACKGROUND OF THE INVENTION

1. Field of the Invention

The present invention relates to fluid exchangers for exchanging transmission fluid in an automatic transmission.

2. Description of the Prior Art

It has long been recognized that the transmission fluid in automatic transmissions should be exchanged periodically to remove impurities and provide new clean effective transmission fluid. Many efforts have been made to provide a satisfactory device to achieve this function in an efficient and convenient manner.

It has been recognized that benefit may be taken of the transmission pump itself to pump used fluid from the transmission to a used fluid tank while simultaneously pumping new fluid into the transmission upstream of the transmission pump. Typically, some automobile transmissions incorporate a bypass which protects the transmission from overpressurization. This bypass may be effective to relieve pressure in the event the pump pumping used fluid in should overpressurize the transmission. However, not all transmissions incorporate this internal bypass arrangement and there exists a risk of overpressurizing the transmission.

One effort to solve the fluid exchange problem led to the development of a fluid exchanger mounted on a small cart and having inlet and outlet control valves for controlling the rate at which fluid is pumped into the transmission. Such exchangers typically employ rather elaborate plumbing which may allow for pressure relief in the event a certain pressure is exceeded. A device of this type is shown in U.S. Pat. No. 5,370,160 to Parker and assigned to the assignee of the instant application. Such devices, while having enjoyed substantial commercial success, are relatively expensive to manufacture and are somewhat bulky to store and use.

Other efforts have led to the proposal of a small hand held exchanger including fluid pumps and valves for controlling flow to and from the automatic transmission. A device of this type is shown in my U.S. Pat. No. 5,743,357 and assigned to the owner of the assignee of the instant application. While providing significant benefits, such devices suffer the shortcoming that there is no provision to prevent overpressurization of the transmission.

Other efforts have been made to sense transmission pressures and equalize such pressures to avoid overpressurization. One such device incorporates a rather elaborate preexchange adapter purportedly used for sensing the pressure in the transmission. Efforts have then been made to balance the inlet and outlet pressures from such transmission across a diaphragm or piston. A device of this type is shown in U.S. Pat. No. 5,472,064 to Viken. While offering some benefits, such devices still suffer the shortcoming that use thereof is relatively time consuming and the systems involve the risk that diaphragm or piston, under high pressure, may result in damage and substantial spillage.

Thus, there exists a need for a transmission fluid exchanger which eliminates the expense of incorporating a fluid pump and which protects the transmission against overpressurization. Other benefits could be derived from providing for a single hook up which would allow for sensing of the transmission pressure by a single gauge which could also be used for sensing the pressure differential during the exchange procedure.

SUMMARY OF THE INVENTION

In one form, the automatic transmission fluid exchanger of the present invention is characterized by a housing having a new fluid passage to be connected to the outlet of an on-demand meter gun suspended from a fluid dispenser reel. The exchanger includes a used fluid passage therein and connected by a return passage for return of used transmission fluid in the event a certain pressure is exceeded. A pressure sensing gauge may be provided for first sensing the operating pressure of the transmission and then sensing pressure differentials during operation of the system.

In another form, the automatic transmission fluid exchanger of the present invention includes a sensor passage connected between the new and used fluid passages and including a pair of spaced apart valve seats therein, a poppet being floatably received between such seats so that it can be pressurized from one seat to the other as the pressure differential builds up thereacross from one side to the other. A pressure gauge may be mounted on such housing in fluid communication with the valve chamber to sense pressure therein.

In the method of the present invention, the exchanger can be coupled with an on-demand automatic transmission fluid supply system including a conventional dispenser gun having a dispenser meter built in. The gun may be coupled with the exchanger and the gun valve handle strapped in position to hold the gun open so that the flow control valves in the exchanger can be utilized to control the inlet and outlet flow rates.

Other features and advantages of the invention will become apparent from the following detailed description, taken in conjunction with the accompany drawings, which illustrate, by way of example, the features of the invention.

DETAILED DESCRIPTION OF THE PREFERRED EMBODIMENT

Figure 2:
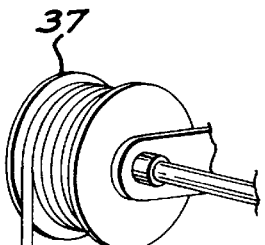
FIG. 2 is a front view, in reduced scale, of the exchanger shown in FIG. 1, connected to an overhead on-demand supply reel.
Figure 2:
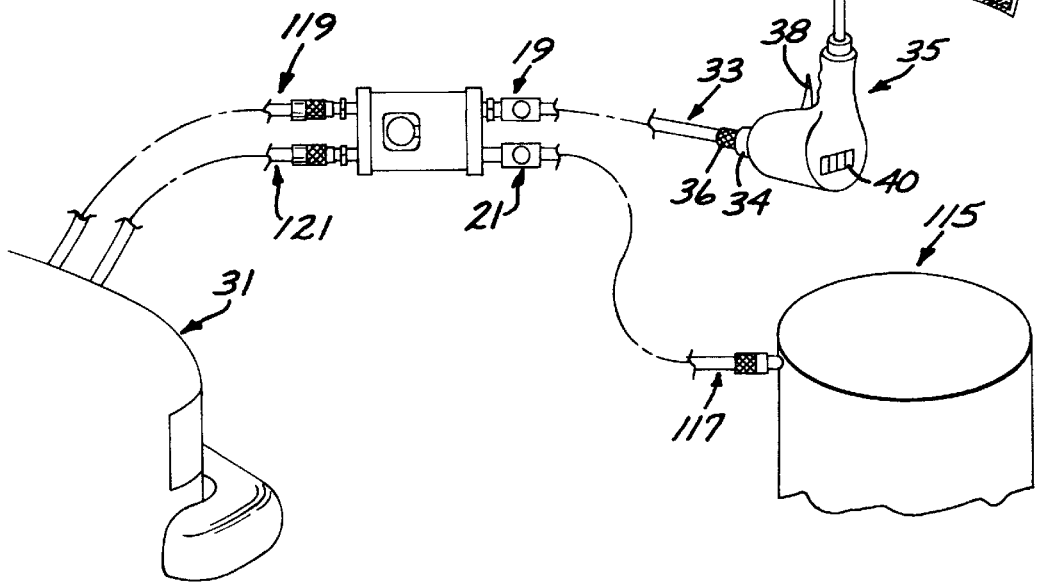
Figure 3:
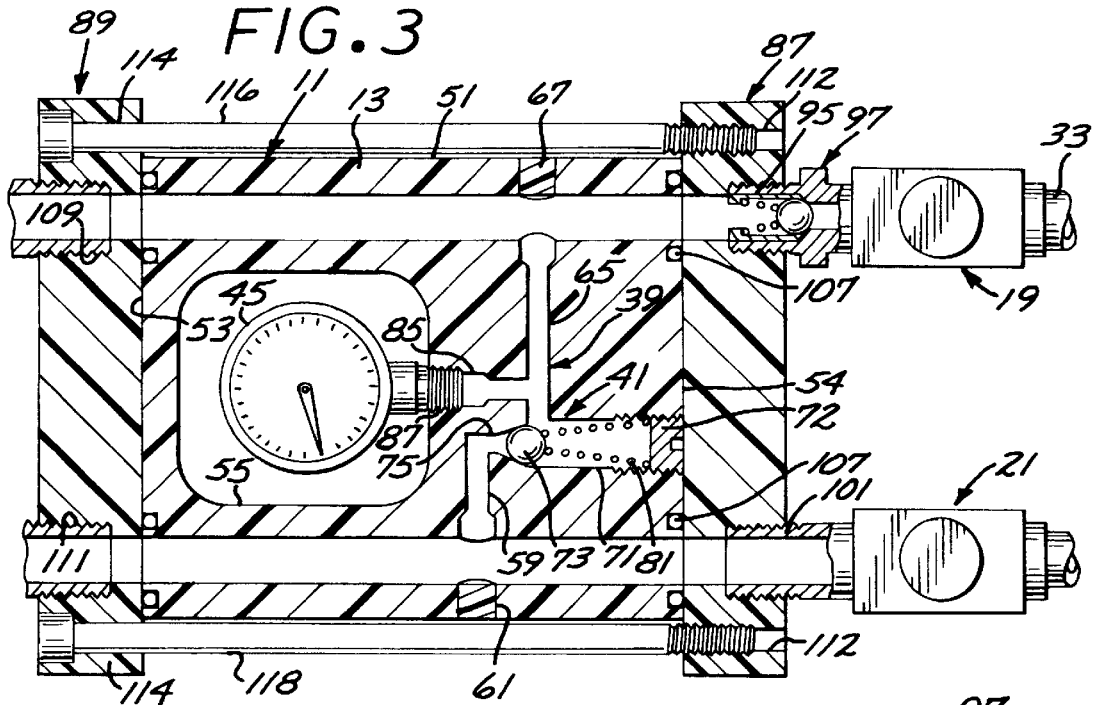
FIG. 3 is a longitudinal sectional view, in enlarged scale, taken from the exchanger shown in FIG. 1.
Figure 4:
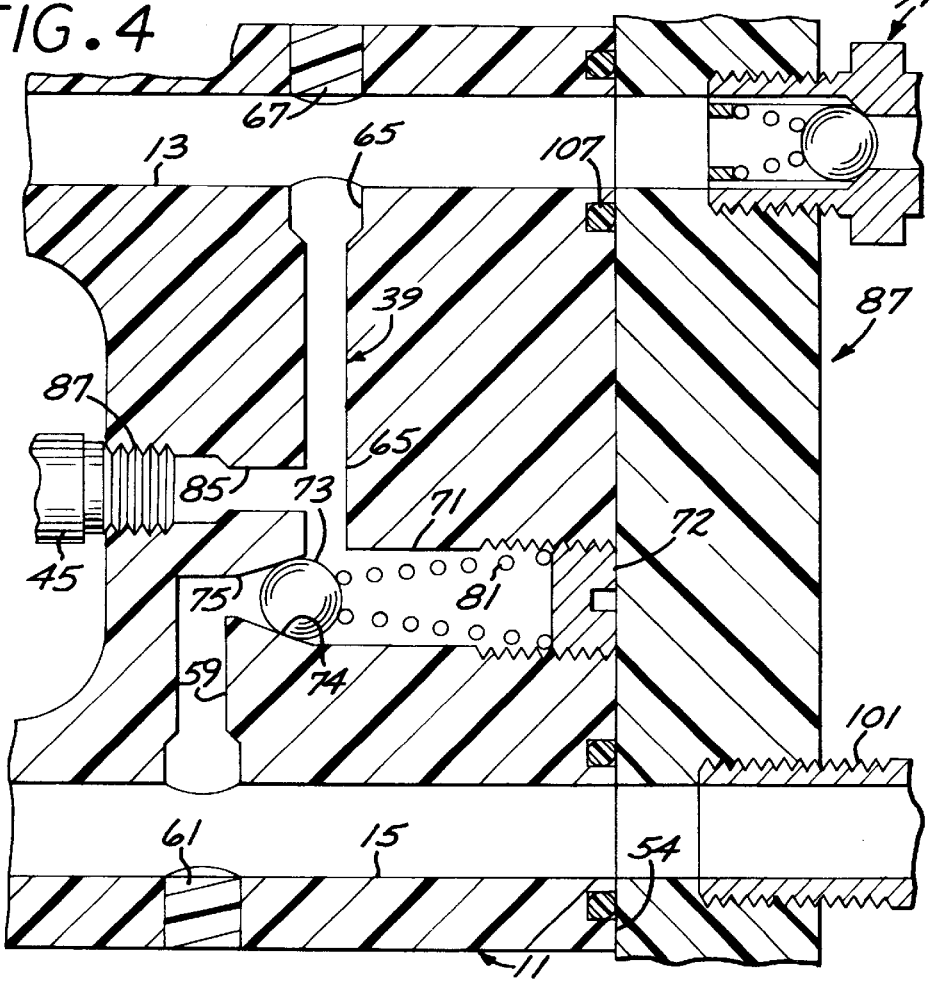
FIG. 4 is a fragmented section view, similar to FIG. 3, but in enlarged scale.

The automatic fluid exchanger of the present invention includes, generally, a lightweight, small housing 11 having respective new fluid and used fluid passages 13 and 15 formed therein and includes on the respective inlet ends respectively a new fluid inlet valve 19a and used fluid outlet valve 21. The respective outlet and inlet ends of the respective flow passages 13 and 15 include quick disconnect couplings, generally designed 25 and 27, for connection with the automatic transmission in a vehicle, generally designated 31 (FIG. 2). The new fluid inlet valve 19 may be connected through a coupling hose, generally designated 33, to an on-demand transmission fluid dispenser gun, generally designated 35, suspended from an overhead reel 37. Referring to FIG. 3, the new fluid and used fluid passages 13 and 15 are connected in communication with one another by means of a return passage, generally designated 39, having a pressure relief valve device, generally designated 41, therein. The passage 39 is in fluid communication with a pressure gauge 45.

Consequently, the new fluid inlet valve 19 may be connected with the nozzle of the gun 35 to suspend the exchanger from the overhead reel 37. When the exchanger is to be used, the valve included in the gun 35 may be held open so that new fluid flow may be controlled by the exchanger valve 19. With the flow control valves 19 and 21 closed, the transmission of the vehicle 31 may be operated to communicate the pressure generated by the transmission pump through the passage 15 and valve 14 to the gauge 45 to determine the magnitude of operating pressure generated by the transmission pump. Then, the valves 19 and 21 may be opened and manipulated to balance the flow rate to and from the transmission and to maintain the desired pressure to avoid overpressurization. Should the pressure from the transmission exceed some predetermined level, as for instance 30 psi, the pressure relief valve 41 will be opened so that the fluid from the transmission can flow through the return passage 39 and back through the new fluid passage 13 to the upstream location in the transmission thereby positively preventing overpressurization.

Conveniently, the housing 11 is constructed of a block 51 of transparent plastic such as LEXAN. The housing is about 7½ inches long, 5/12 inches wide and 1½ inches thick, weighing about six pounds. The block 51 is of rectangular shape and planar on its opposite ends 53 and 54. Referring to FIG. 3, equal diameter parallel bores are machined in the block to form the respective passages 13 and 15. The block is formed centrally with a transverse aperture 55 through the depth thereof for receipt of the pressure gauge 45. Machined inwardly from one side of the housing block is a first bore defining a used fluid relief passage section 59 which extends laterally from the passage 15. The outer end of the access bore to such section 59 is plugged by a plug 61. Machined in from the opposite side of the housing block is a new fluid return passage section 65 which likewise has the outer access bore plugged by a plug 67. The used fluid relief passage section 59 and new fluid return passage section 65 cooperate to form the return passage 39. Machined in from the end 54 of the block is a large diameter bore defining a spring compartment 71. The inner end of the spring compartment is formed with a conical valve seat which steps down to a longitudinal used fluid return passage section 75. The conical seat 74 is so sized that the ball 73 seats thereagainst with substantially a full diametrical half exposed to the new fluid side as will be discussed hereinafter. The spring compartment bore 71 is threaded at its external extremity for receipt of a threaded adjustment plug 72. Mounted in the spring compartment 71 interposed between such poppet and plug is a conically shaped coil spring 81 which resiliently presses a ball poppet 73 against the seat 74. The plug 72 may be adjusted to apply the necessary pressure to such spring to cause it to hold the ball poppet 73 on the seat 74 until a selected pressure differential is reached across such ball. The spring is thus set to a bias which will allow the valve 41 to open at a pressure less than that which would damage the transmission. Machined inwardly from the aperture 55 is a pressure gauge passage section 85 into which is screwed a threaded nipple 87 mounting the pressure gauge 45.

It will be appreciated by those skilled in the art that the new fluid section 65 of the return is laterally offset to the downstream side of the poppet 73 such that new fluid pressure will pressurize such poppet toward the seat 74 to positively maintain such poppet seated until the pressure in the used fluid passage builds up to the point where the transmission pressure exceeds the new fluid pressure to thus drive such ball off the seat.

The bypass valve 41 may take many different configurations, such as a ball valve, flapper valve, piston valve or the like. It is only important that the valve provide for isolation between the inlet and outlet passages but, at some predetermined pressure, allow for recirculation from the used fluid passage to the new fluid passage.

As known by those skilled in the art, some transmissions include internal bypass valves which might open at about 60 psi to thus provide a safety measure to prevent overpressurization and consequent damage to the transmission and seals incorporated therein. Not all transmissions incorporate such a bypass and, even for those that do, it is beneficial to have an additional safety measure to positively prevent overpressurization and consequent damage to the transmission. This is particularly true when the exchanger takes advantage of the relatively high pressures typically employed in an on-demand transmission fluid delivery system.

The housing 11 includes respective end plates, generally designated 87 and 89, on the opposite ends thereof. The end plate 87 is formed with through bores aligned with the respective new and used fluid passages 13 and 15, the new fluid bore being threaded at its outer extremities for receipt of a check valve nipple 95 included in a check valve, generally designated 97, which mounts the flow control valve 19. The used fluid outlet bore is also internally threaded for receipt of a threaded nipple 101 mounting the used fluid outlet valve 21. It will be appreciated that the end walls 53 and 54 are both formed around the passageways 13 and 15 with O-ring glands that mount O-rings 107 to provide sealing engagement with the end plates to prevent leakage.

The end plate 89 is formed with respective outlet and inlet bores aligned with the respective passages 13 and 15 and such bores are internally threaded for receipt of respective nipples 109 and 111 which mount the respective quick disconnect couplings 25 and 27.

The end plates 87 and 89 are further formed at their opposite sides with through bores 112 and 114 for receipt of the opposite ends of respective tie rods 116 and 118 which can be tightened down to compress such end plates against the opposite end faces 53 and 54 of the housing block. As will be appreciated by those skilled in the art, the housing 11 may conveniently be constructed with a length of about ten inches, width of about seven inches and depth of about two inches. The overall device might weigh about five or six pounds so it can be conveniently suspended from the overhead reel 37.

Referring to FIG. 2, a used fluid dump tank, generally designated 115, is connected with the used fluid outlet valve 21 by means of a dump fluid hose, generally designated 117. With continued reference to FIG. 2, the respective couplings 25 and 27 are connected with the transmission system of a vehicle 31 by means of respective upstream and downstream connector hoses, generally designated 119 and 121, respectively.

In operation, it will be appreciated that the exchanger of the present invention may be conveniently connected to the transmission fluid dispenser gun 35 by the coupling 33 (FIGS. 2 and 3). It will be appreciated that conventional suspension guns 35 are typically provided with a wand or spout connected to a fitting 34. Such wand may be removed and a quick disconnect fitting mounted thereon for connection with the quick disconnect 36 of the coupling 33. The conventional dispenser guns 35 typically incorporate a trigger handle 38 which is depressible to open the gun valve and allow pressurization from the source to force transmission fluid through the gun. My new method contemplates use of a releasable fastener such as a hook and pile strap 42 which is wrapped around the body of the gun and the trigger 38 to hold the trigger actuated valve open. It will be appreciated that any desirable belt, clamp or clip may be utilized to hold the trigger down and the gun valve open. The gun 35 typically incorporates a meter having a display 40 which displays the quantity of fluid counted during a single dispensing procedure. This meter will be re-set to zero before the operation is commenced.

The used fluid dump coupling hose 117 may then be coupled between the used fluid passage outlet and the dump tank 115. Entry is then gained to the automatic transmission vehicle 31 upstream of the transmission pump. This may be through cooling line connections as by insertion of spigots or any other convenient manner. The new fluid coupling 119 is thus connected with the downstream end of the new fluid passage 13 by means of the quick disconnect coupling 25 and the opposite end of such coupling 119 then coupled to the upstream location in the transmission. A downstream location in the transmission system is then accessed, as by accessing a cooling line returning from the transmission, and inserting a pet cock or the like. The distal end of the used fluid coupling 121 is then connected with the downstream pet cock and the coupling coupled with the used fluid inlet quick disconnect coupling 27.

With the flow control valves 19 and 21 closed, the automobile engine can then be started and the transmission actuated to pump transmission fluid from the transmission out of the coupling hose 121. It will be appreciated by those skilled in the art that should the technician hook the inlet and outlet hoses 119 and 121 up wrong, the transmission pressure will be introduced to the new fluid passage 13. Fluid flow from such passage to the new fluid supply will be blocked by the check valve 97 to thus communicate pressure directly to the gauge 45. Flow from such new fluid passage 65 back to the used fluid passage 15 is blocked by the ball poppet 73. The transmission pressure could be on the order of 60 psi thus giving the technician a ready indication that the hoses have been hooked up backward. The technician may then switch the hoses and continue with the procedure.

Operation of the transmission with the hoses hooked up correctly will introduce used fluid into the upstream end of the used fluid passage 15 to flow laterally through the used fluid return section 59 (FIG. 3). Assuming the used fluid control valve 121 has remained closed, the transmission will build pressure up in the passage 13 and return section 15 to the point where the poppet ball 83 will be lifted off the seat 73 to permit such transmission fluid to flow on out the new fluid return section 65 against the bias of the spring 81 to the used fluid passage 13 and back into the upstream location of the transmission thus completing a bypass loop. The pressure gauge 45 will sense this pressure so the technician will know the transmission pressure. This pressure may then be recorded for future reference to assist the operator in his endeavor to avoid overpressurizing the transmission with the incoming new fluid passing through the new fluid passage 13.

The operator may then concurrently open the used fluid valve 21 and new fluid valve 19 to commence flow of used fluid through the passage 15 to the dump tank 115 of used fluid into the passage 13. The pressure in the used fluid passage 15 will thus drop thus lowering the pressure in the used fluid return section 59 allowing the poppet 83 to be urged back onto the seat 74 by the spring 81.

The pressurized new fluid introduced through the valve 79 will flow through the check valve 95 to build up pressure in the new fluid passage 13 and flow new fluid through the coupling hose 119 to the upstream location in the transmission system to replace transmission fluid being displaced through the used fluid coupling hose 121. The valves 19 and 21 may be adjusted to balance the flow in and out of the transmission. The quantity of fluid flowing into the transmission will be counted on the meter 40 to give the operator an indication of the quantity of fluid being introduced to the transmission. As the pressure builds up in the new fluid passage 13, it will be appreciated that such pressure will be communicated through the new fluid return passage section 65 to ball poppet 73 thus tending to pressurize such ball poppet more firmly on its seat 74 to seal against bypassing of the used fluid being pumped by the transmission pump to the passage 15. As long as the pressure differential across that poppet ball 73, as assisted by the spring 81, remains positive toward the closed valve position, the return valve 41 will remain closed.

The new fluid valve 19 may be manipulated to control flow of new fluid to the point where the pressure sensed by the pressure gauge 45 does not exceed the operating pressure previously established for the transmission itself to thus avoid overpressurizing of the transmission and consequent possible damage to the transmission seals and the like. As new fluid continues to flow into the transmission, it will be appreciated that the fluid pressure through the gun 35 will drop thus reducing the pressure at the supply tank (not shown) which is sensed at that location to actuate an air compressor or the like to maintain the supply fluid pressurized so that flow will continue. If during the operation, there is any irregular activity which might affect the balance of flow and cause the pressure in the used fluid passage 15 to build up, the pressure differential across the ball may become sufficient to lift such ball 83 off its seat and allow the used fluid to escape past such ball and flow back into the new fluid passage 13 and back to the transmission in a loop.

It is a characteristic of the hot transmission fluid flowing from the transmission and the cold new fluid flowing through the passage 13 that such fluids will typically not mix but, rather, maintain a laminar flow. The transparency of the housing 11 thus acts as somewhat of a window so the operator can view flow in the passage 13. The used fluid will typically have somewhat of a dirty appearance readily distinguishable from the color of the incoming new fluid. Consequently, the operator will have a ready view for comparison of the color of the two fluids for a ready comparison to obtain an indication of the extent to which fluid flowing from the transmission is clean or contaminated.

The operator can also view the color of both fluids in the respective new fluid and used fluid passages 13 and 15 and when the fluid in the used fluid passage 15 approaches that of the new fluid passage 13, he or she will know that the transmission fluid in the transmission has been sufficiently exchanged. The new fluid valve 19 may then be closed, the transmission stopped and the used fluid control valve 21 also closed. The operator may then observe the counter meter 40 on the gun 35 to determine the quantity of transmission fluid consumed in the operation. This amount will then be recorded so the vehicle owner will have an accurate indication of the quantity of transmission fluid used in the process. The new and used fluid coupling hoses 119 and 121 are then disconnected from the transmission and the pet cocks in the transmissions cooling hoses closed and the vehicle is then ready for delivery to their owners. The meter 40 on the dispenser gun 35 may then be reset to zero and the exchanger is ready for the service of the next vehicle.

Figure 1:
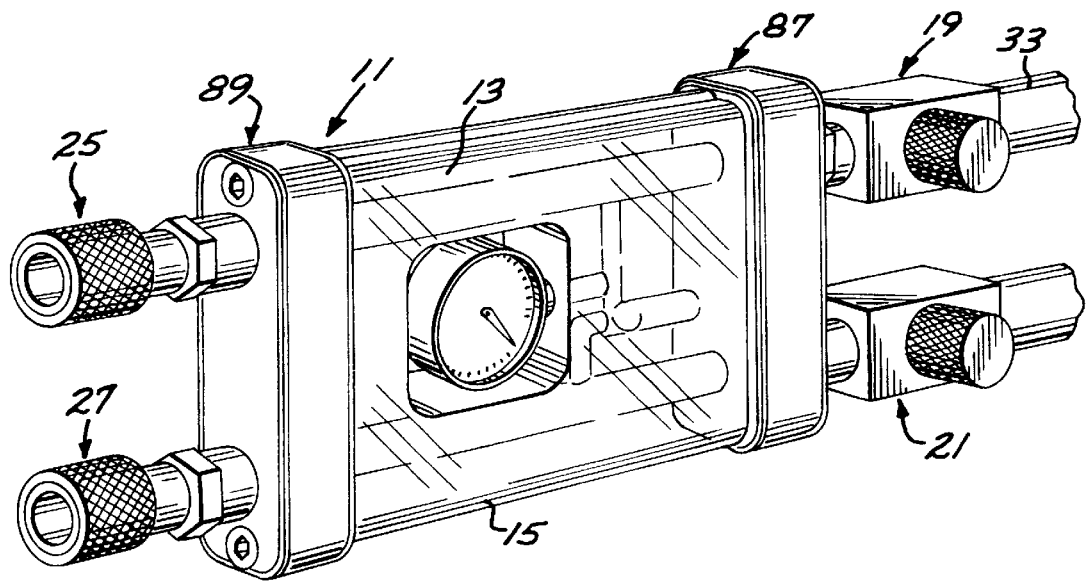
FIG. 1 is a perspective view of an automatic transmission fluid exchanger embodying the present invention.
Figure 5:
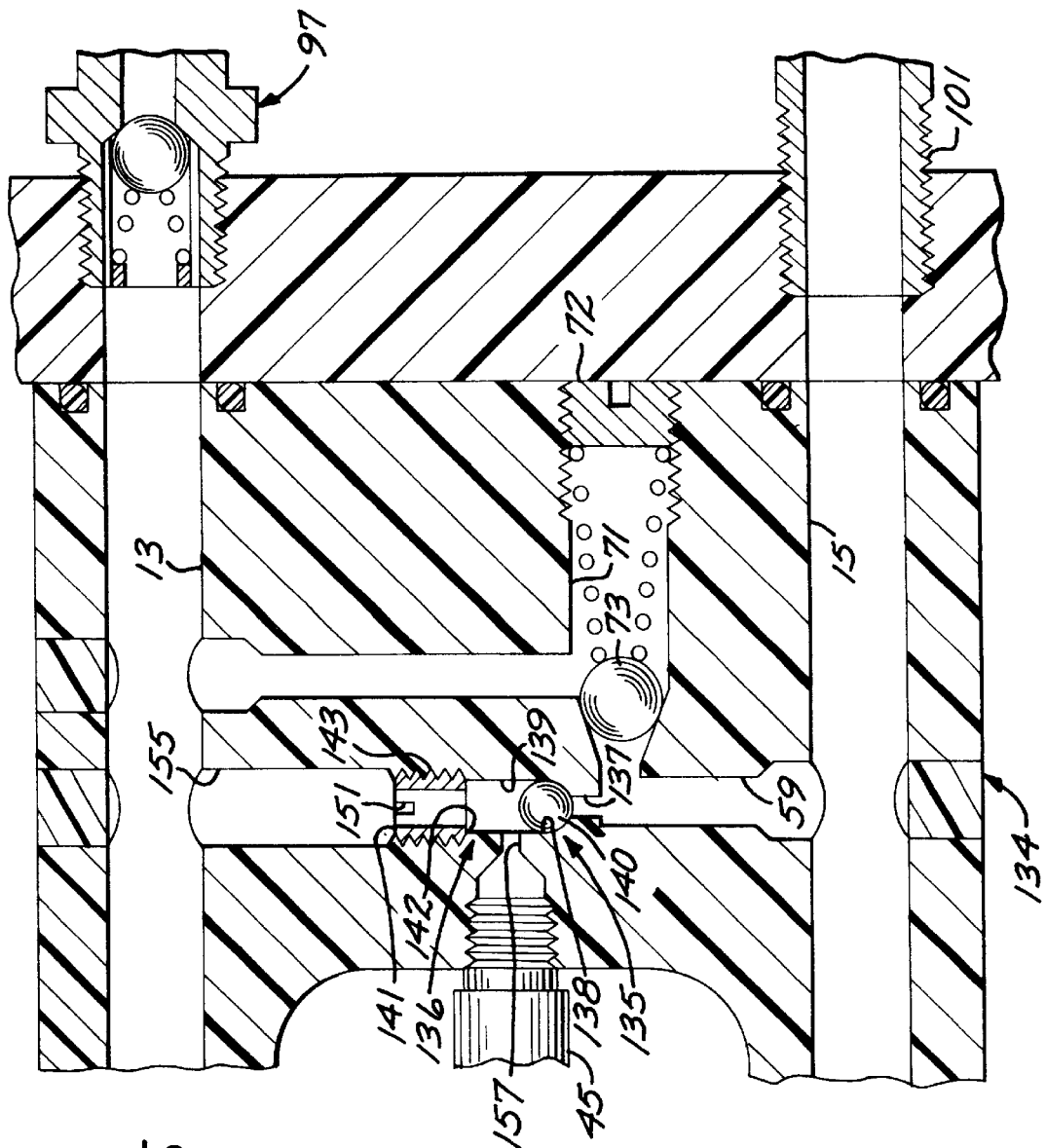
FIG. 5 is a sectional view similar to FIG. 4 showing a second embodiment of the automatic transmission fluid exchanger of the present invention.

The hand held exchanger shown in FIG. 5 is similar to that shown in FIGS. 1–3 except that the housing, generally designated 134, includes an integral sensor valve device, generally designated 135, for selectively sensing pressure between the new and used fluid passages 13 and 15, respectively. The sensor valve 135 is formed by a sensor passage, generally designated 136, machined in the housing to extend transversely between the used fluid bypass passage 59 and the new fluid passage 13. The passage 136 is in the form of a series of stepped bores, including a reduced-in-diameter orifice 137 leading from the used fluid return passage 59 and having a conical valve seat 138 formed adjacent thereto to form a transition upwardly to a larger diameter valve chamber 139 and having seated thereon a sensor ball poppet 140. Formed on the new fluid side of such chamber 139 is an internally threaded bore 141 which receives an externally threaded insert 143 to form a valve seat 142 facing the seat 138. The insert 143 includes an axially outwardly opening diametrical slot 151 on the external end thereof for receipt of the blade of a screwdriver or the like. Formed on the new fluid side of such insert 143 is an enlarged-in-diameter access passage section 155 leading from the new passage 13.

In this embodiment, a transversely extending sensing port 157 is formed to lead laterally from the valve chamber 139 and is configured at its enlarged extremity with internal threads for receipt of the external threads of a nipple included in the pressure gauge 45.

In operation, the fluid exchanger shown in FIG. 6 may be hooked up like the fluid exchanger described in FIGS. 1–5 to place the new and used fluid passages 13 and 15 in communication with the respective upstream and downstream locations in the transmission. Similarly, the pressure adjustment plug 72 will be adjusted for the desired relief pressure to protect the transmission. It will be appreciated that this relief pressure may be set for the model of vehicle for which the transmission fluid is to be changed. The bypass pressure may be set at any desired level to protect the transmission being serviced. In any event, once the coupling hoses 119 or 121 are hooked up, the car engine might be started to pressurize the transmission to its operating pressure. The technician can observe the sensor poppet 140 through the window-like transparency of the housing 134. If the poppet is driven away from the new fluid passage 13 toward the seat 138, the technician will know that the transmission pump is pressurizing the new fluid passage so such hoses must be hooked up incorrectly. It will be appreciated that such pressurization of the new fluid passage also serves to maintain the check valve 97 and relief valve 41 closed while pressurizing the gauge 45 with the transmission pressure. In any event, the connection of the hoses may be reversed and the exchange procedure started.

As the pressure differential across the poppet 140 varies, such poppet will be urged to the one end or the other of the valve chamber 139 to seat against either the seat 138 or the seat 142. The gauge 45 will sense the pressure on the open side of the poppet ball 140. The flow control valves 19 and 21 may be adjusted to vary the flow therethrough in effort to maintain approximately equal flow in both directions. The pressure in the new and used fluid passages will thus tend to equalize. It is a characteristic of most pressurization systems in on-demand sources feeding supply reels 37 that they will tend to oscillate on and off resulting in the poppet ball 140 oscillating back and forth between the seats 138 and 142 thus giving the technician an indication that the flow rates are fairly well balanced. This adjustment may then be maintained so the technician will be assured that new fluid is being flowed into the transmission at substantially the same rate as used fluid is being removed.

The pressure gauge 45 is operative to sense the pressure from either the transmission or new fluid source as communicated from either the used fluid passage 15 or new fluid passage section 13.

It will be appreciated that, should the transmission pressure build up excessively, the orifice 137 will restrict flow through the sensor valve chamber 139 thus causing the differential to build up across the bypass poppet 73 to thereby allow the used fluid to bypass back to the new fluid passage 13 and back to the transmission.

When the color of the used fluid in the used fluid transmission approaches the color of the new fluid in the new fluid passage, the technician will know that the exchange of fluid has been completed. He or she may then close the flow control valves 19 and 21, stop the automobile engine and disconnect the coupling hoses 119 and 121. As before, the technician will then record the quantity of fluid used as indicated by the meter 40 (FIG. 2).

From the foregoing, it will be appreciated that the transmission fluid exchanger of the present invention is relatively inexpensive to manufacture and conveniently utilizes the on-demand pump incorporated in an on-demand dispenser system already installed in many service station installations and utilizes the meter typically incorporated in conventional dispenser guns already part of the installation facility. Additional features of the present invention are that a single pressure gauge can be utilized to determine the operating pressure of the transmission and to then monitor the pressure of the exchanger system during operation so as to allow the operator to make adjustments to avoid overpressurization.

While particular forms of the invention have been illustrated and described, it will be apparent that various modifications can be made without departing from the spirt and scope of the invention.

What is claimed is:

1. A hand held transmission fluid exchanger for connection with the dispenser outlet of on-demand metering head having a meter for indicating the volume of fluid exchanged and comprising:

a housing to be suspended from said metering head and including a new fluid passage for connection on an upstream end to said dispenser outlet and on its downstream end with a transmission system inlet location upstream of the transmission pump, said housing further including a used fluid passage for connection on its upstream end with a transmission system outlet location downstream of the transmission pump and on its downstream end with a used fluid storage device;

said housing further including a return passage for flow of fluid in the return direction from said used fluid passage to said new fluid passage; and a pressure relief valve device in said return passage operative to, at a predetermined pressure differential between said used fluid passage and new fluid passage, to bypass used fluid to said new fluid passage via said return passage.

2. A transmission fluid exchanger as set forth in claim 1 that includes:

a pressure gauge in said housing in connection with said new fluid passage.

3. A transmission fluid exchanger as set forth in claim 1 that includes:

a used fluid valve at said downstream end of said used fluid passage.

4. A transmission fluid exchanger as set forth in claim 1 that includes:

a new fluid valve at said upstream end of said new fluid passage.

5. A transmission fluid exchanger as set forth in claim 1 that includes:

a check valve at said upstream end of said new fluid passage for restricting flow of fluid upstream.

6. A transmission fluid exchanger as set forth in claim 1 wherein:

said housing is a block and said passages are formed therein.

7. A transmission fluid exchanger as set forth in claim 6 wherein:

said housing is transparent.

8. A transmission fluid exchanger as set forth in claim 6 wherein:

said passages are machined bores.

9. A transmission fluid exchanger as set forth in claim 1 that includes:

a transparent viewing window for viewing the fluid in said new fluid passage.

10. A transmission fluid exchanger as set forth in claim 1 wherein:

said relief valve device includes a valve seat and a poppet seatable on said seat and so arranged that the pressure differential between said new fluid passage and used fluid passage tend to seat said poppet on said seat.

11. A transmission fluid exchanger as set forth in claim 10 wherein:

said poppet is spherical.

12. A transmission fluid exchanger as set forth in claim 1 wherein:

said valve device includes a used fluid segment of a predetermined cross sectional diameter in said return passage and configured with a valve seat, a valve poppet section of a diameter larger than said predetermined diameter confronting said seat, a poppet in said poppet section for seating on said seat, and a spring urging said poppet against said seat.

13. A transmission fluid exchanger as set forth in claim 1 wherein:

said housing is constructed of a solid block with said new and used fluid passages formed therein extending longitudinally co-extensive with one another;

said return passage being formed in said block with a used fluid segment leading laterally from said used fluid passage and turning longitudinally to form with a valve seat facing in the longitudinal direction; and said valve device includes a spring compartment formed longitudinally in said block to confront said seat, a spring in said spring compartment send said poppet toward said seat.

14. A transmission fluid exchanger as set forth in claim 1 including:

a coupling including an inlet fitting on one end for coupling to said dispenser outlet fitting and a fitting on the opposite end for coupling to said upstream end of said new fluid passage.

15. A transmission fluid exchanger as set forth in claim 1 that includes:

said housing is constructed of LEXAN and said passages are machined therein.

16. A transmission fluid exchanger as set forth in claim 1 that includes:

quick disconnect couplings mounted in said housing at the respective downstream and upstream ends of the respective said new fluid and old fluid passages.

17. A transmission fluid exchanger as set forth in claim 1 wherein:

said housing includes a sensor passage connected between said new and used fluid passages; and a sensor check valve responsive to the pressure differential between said new and used fluid passages for limiting fluid flow therebetween.

18. A transmission fluid exchanger as set forth in claim 1 wherein:

said housing is formed with a sensor passage in communication on opposite ends with said new and used fluid passages, respectively, and formed centrally with a valve chamber;

a pair of valve seats in said sensor passage on opposite sides of said valve chamber; and a poppet in said valve chamber intermediate said seats to shift back and forth between said seats.

19. A transmission fluid exchanger as set forth in claim 18 wherein:

said poppet is spherical.

20. A transmission fluid exchanger as set forth in claim 18 wherein:

said housing includes at least a transparent window portion for viewing of said poppet.

21. A transmission fluid exchanger as set forth in claim 18 wherein:

said housing is block shaped with said sensor passage machined therein.

22. A transmission fluid exchanger as set forth in claim 18 wherein:

said sensor passage is formed with a reduced-in-cross section orifice for restricting the rate of flow from said used fluid passage.

23. An automatic transmission fluid exchanger apparatus having new and used fluid passages for connection to respective upstream and downstream location in an automatic transmission, that includes:

a housing formed with a sensor passage in communication on opposite ends with said new and used fluid passages, respectively, and formed centrally with a valve chamber;

a pair of valve seats in said sensor passage on opposite sides of said valve chamber; and a poppet in said valve chamber intermediate said seats to shift back and forth between said seats.

24. A transmission fluid exchanger as set forth in claim 23 wherein:

said poppet is spherical.

25. A transmission fluid exchanger as set forth in claim 23 wherein:

said housing includes at least a transparent window portion for viewing of said poppet.

26. A transmission fluid exchanger as set forth in claim 23 wherein:

said housing is block shaped with said sensor passage machined therein.

27. A transmission fluid exchanger as set forth in claim 23 that includes:

a pressure gauge mounted on said housing in fluid communication with said valve changer to sense pressure therein.

28. A transmission fluid exchanger as set forth in claim 23 wherein:

said valve chamber is configured to provide for said poppet to float freely between said valve seat as dictated by the pressure differential thereacross.

* * * * *